United States Patent [19]

Trotter et al.

[11] Patent Number: 5,279,481
[45] Date of Patent: Jan. 18, 1994

[54] AIRBORNE LIQUID-SPREADING SYSTEM

[75] Inventors: Victor D. Trotter; Robert L. Woods, both of Arlington, Tex.

[73] Assignee: Air Tractor Inc., Olney, Tex.

[21] Appl. No.: 935,156

[22] Filed: Aug. 25, 1992

[51] Int. Cl.$^5$ .......................... B64D 1/16; B67D 5/14; B67D 5/30
[52] U.S. Cl. .................................... 244/136; 169/53; 239/171; 222/14; 222/52; 222/64
[58] Field of Search .................... 244/136; 169/47, 53; 239/171; 222/64, 59, 14, 52

[56] References Cited

U.S. PATENT DOCUMENTS

| | | | |
|---|---|---|---|
| 2,665,092 | 1/1954 | Sands | 239/171 |
| 3,423,053 | 1/1969 | Hawkshaw | 244/136 |
| 3,452,931 | 7/1969 | Knowles | 239/171 |
| 3,455,511 | 7/1969 | Fedorenko | 239/171 |
| 3,463,398 | 8/1969 | Smith et al. | 239/171 |
| 3,494,423 | 2/1970 | Stansbury et al. | 169/53 |
| 3,661,211 | 5/1972 | Powers | 239/172 |
| 3,698,480 | 10/1972 | Newton | 169/53 |
| 3,754,601 | 8/1973 | Linkewich | 169/53 |
| 3,901,467 | 8/1975 | Hawkshaw | 244/136 |
| 4,315,317 | 2/1982 | Orchard et al. | 239/171 |
| 4,664,340 | 5/1987 | Jackson | 244/136 |
| 4,936,389 | 6/1990 | MacDonald et al. | 169/53 |

FOREIGN PATENT DOCUMENTS

| | | | |
|---|---|---|---|
| 709294 | 5/1965 | Canada. | |
| 0317897 | 12/1989 | Japan | 244/136 |
| 1378856 | 3/1988 | U.S.S.R. | |

OTHER PUBLICATIONS

Transland Aircraft's Aerial Application Equipment Catalog, pp. 12-13, Nov. 1, 1960 Torrence, Ca.

*Primary Examiner*—Michael S. Huppert
*Assistant Examiner*—Lissi Ausley
*Attorney, Agent, or Firm*—John M. Cone; William Loyd Clayborn

[57] ABSTRACT

An airborne container for a liquid or other flowable material has bottom doors which are opened to release the material on the ground below the aircraft. To maintain a specified coverage level, a control system which includes a digital controller repeatedly calculates a differential pressure across the doors and varies the position of the doors to maintain a constant material flow rate as the differential pressure varies. The control system closes the doors when a specified volume of material has been spread.

37 Claims, 3 Drawing Sheets

AIRBORNE LIQUID-SPREADING SYSTEM

BACKGROUND OF THE INVENTION

The present invention relates to a system for spreading liquids and other flowable materials on the ground from an aircraft.

Aircraft are widely used to fight forest and grass fires by spreading water or other fire-retardant materials on the fire. Similarly, aircraft are used to seed forests and to spread fertilizer and insecticides on agricultural crops.

One of the major factors in successfully fighting a fire is the volume of fire retardant spread over a given area. "Coverage level" is the number of gallons spread per 100 square feet. The objective is to spread enough retardant to suppress the fire without using more than is necessary.

In a simple form of airborne fire-fighting system, a container for fire retardant has one or more doors or openings which are opened to drop the entire load of retardant. Examples of that form of system are disclosed in U.S. Pat. Nos. 3,661,211 (Powers), 3,423,053 (Hawkshaw), 3,698,480 (Newton), and 3,754,601 (Linkewich), and Canadian Patent Number 709,294 (Stevenson et al).

The system described above has several disadvantages. Because the doors are opened to a constant position during the drop, the retardant flow rate decreases as the level of retardant in the container decreases. Thus, the coverage level decreases from the beginning of the drop to the end of the drop. In addition, this system does not take into account the effect of the aircraft's vertical acceleration on coverage level. If the aircraft's vertical acceleration is greater or less than one G, the coverage level will increase or decrease, respectively. This type of system also does not take into account the effect of the aircraft's speed on coverage level. As aircraft speed increases, coverage level decreases.

U.S. Pat. No. 4,936,389 (MacDonald et al) discloses a system in which the position of the container doors is varied in response to the position of a float supported on the surface of the fire retardant. The system does not, however, compensate for the aircraft's vertical acceleration or speed. Also, the system does not provide for true continuous control of the container doors, in that the float-actuated level sensor measures retardant level in discrete increments.

SUMMARY OF THE INVENTION

An object of the present invention is to provide a system which spreads liquids and other flowable materials on the ground at a constant coverage level, which system compensates for the effects of the aircraft's vertical acceleration and speed over the ground. Another object of the invention is to provide a system that may be easily adapted to perform a variety of functions, such as fighting forest fires and grass fires, seeding forests, and spreading insecticides and fertilizer on agricultural crops.

According to the invention, there is provided a system for spreading liquids and other flowable materials on the ground from an aircraft at a specified coverage level, said system comprising: a container carried by the aircraft and adapted to contain said material; means for releasing said material from the container; and means for controlling the releasing means, the control means being responsive to the difference in pressure between the material within the container adjacent to the release means and air outside the container adjacent to the release means. Advantageously, the material is spread on the ground at a constant coverage level and the system may be easily adapted to perform any function requiring spreading a liquid or other flowable material on the ground from an aircraft.

In a preferred embodiment of the invention, the container is mounted within the fuselage of an aircraft. Two opposed, longitudinally extending doors form the bottom of the container, and each door is attached to the container by at least one hinge. An electrically-controlled rotary hydraulic actuator is mechanically linked to the doors and acts to move the doors about the hinges.

The rotary actuator is controlled by an electronic control system comprising a pilot interface panel, a digital controller, a level sensor, an accelerometer, and a servo card. The pilot interface panel is used by the pilot to input the desired coverage level, aircraft speed over the ground, and volume of material to be dropped. The pilot interface panel also provides displays for the coverage level, volume of material to be dropped, length of the drop pattern on the ground, and volume of material in the container. The level sensor provides an input from which the digital controller calculates the volume of material in the container before commencing and after completing a drop. The accelerometer provides a vertical acceleration signal that the digital controller uses in calculating the rotary actuator angle required to maintain a constant material flow rate and, thus, a constant coverage level. The servo card accepts the digital controller's output signal, subtracts a feedback signal from the rotary actuator, and directs the resulting control signal to the rotary actuator.

The digital controller includes a memory in which is stored a program that controls the controller's operation and several experimentally-determined tables that are used in the controller's calculations. Those tables are: level sensor input vs. volume of material in the container, coverage level and volume of material in the container at the end of the drop vs. volume dropped while the doors close, effective flow area of the door opening vs. rotary actuator angle, and volume of material in the container vs. height of material in the container.

The pilot initiates a drop by placing an arm switch in the ON position and momentarily pressing a fire button. Once begun, the drop continues automatically without any further action on the part of the pilot.

After the fire button is pressed, the controller calculates the flow rate required to yield the desired coverage level, the desired volume of material remaining in the container at the end of the drop, and volume of material remaining in the tank at which to begin closing the doors. Thereafter, the controller repeatedly calculates the volume of material remaining in the container and the actuator angle required to maintain the desired material flow rate. An output representing the required actuator angle is directed to the servo card, whose output controls the actuator and, thus, the doors.

The controller's actuator angle calculation is based upon a formula that includes a close approximation of the differential pressure across the doors. The differential pressure is an approximation in that the formula neglects the difference between the air pressure in the container above the material and the air pressure below the doors, a valid assumption in the airspeed range in which the aircraft operates during a drop. The formula used by the controller is as follows:

$$A = \frac{Q}{\sqrt{2HgN}},$$

where
- A = effective flow area of the door opening,
- Q = desired flow rate,
- H = theoretical height of the material in the container,
- g = the acceleration of gravity, and
- N = vertical acceleration of the aircraft.

During each actuator angle calculation, the calculated volume of material remaining in the container is converted to the theoretical height of the material in the container and the accelerometer is read. The controller then solves the above formula and converts the result to an actuator angle using the effective flow area of the door opening vs. actuator angle table.

After each actuator angle calculation, the controller again calculates the theoretical volume of the material remaining in the container. When the theoretical volume is equal to the previously calculated volume in the container at which the doors must begin to close, the actuator angle calculations are terminated and the controller causes the doors to close.

The final step in the controller program comprises comparing the actual volume of material remaining in the container with the actual volume of material remaining. The result is used to update the table that relates the coverage level and volume of material in the container at the end of the drop to the gallons dropped while the doors close.

BRIEF DESCRIPTION OF THE DRAWINGS

An embodiment of the invention will be described, by way of example only, with reference to the accompanying drawings, in which.

DETAILED DESCRIPTION OF THE INVENTION

The Mechanical System

Figure 1:
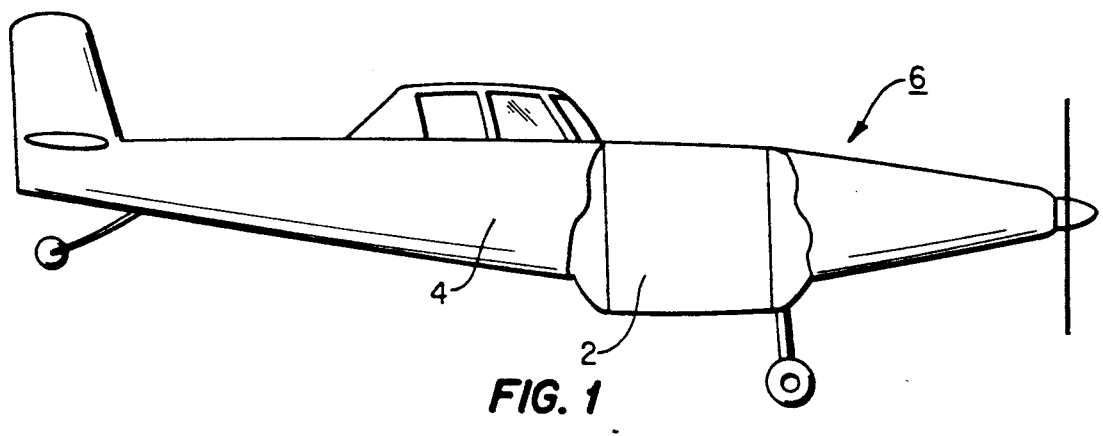
FIG. 1 is a side view of an aircraft incorporating an embodiment of the invention with parts of the aircraft broken away to show the container.
Figure 2:
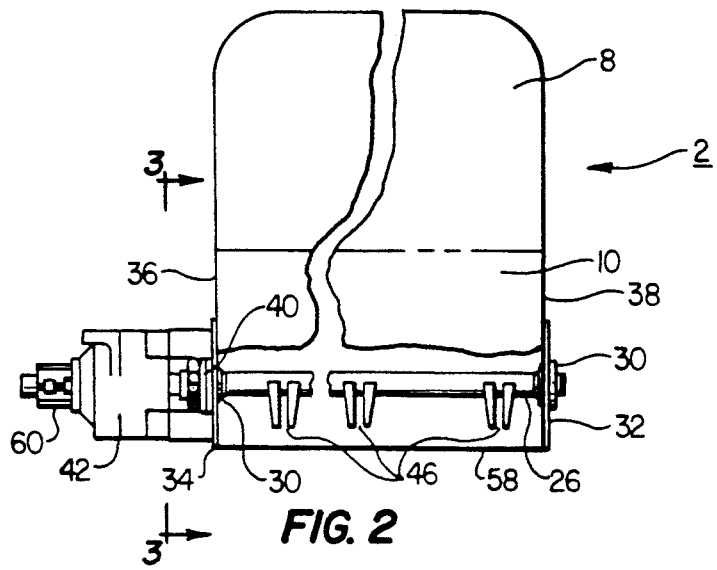
FIG. 2 is a side view of the container without doors and with a portion of the container broken away to show interior details.
Figure 3:
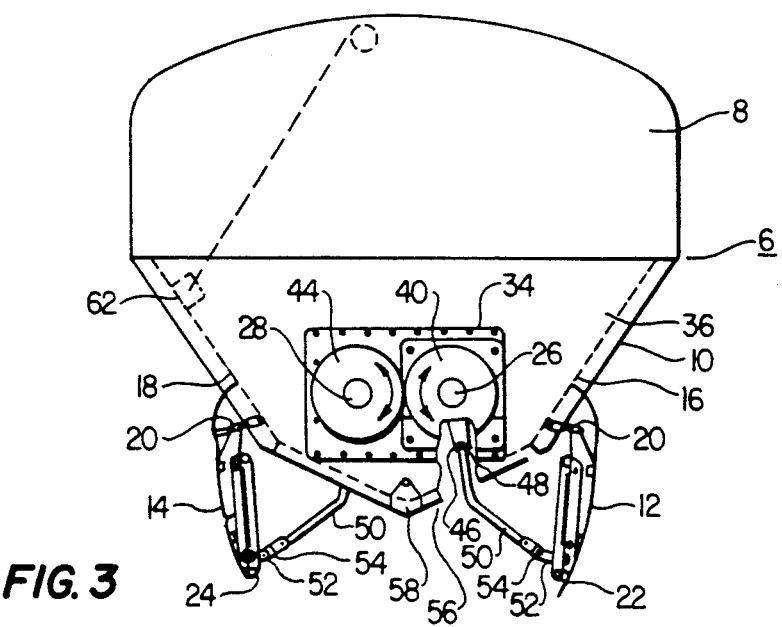
FIG. 3 is an end view of the container taken in the plane indicated by line 3—3 in FIG. 2.

Referring to FIGS. 1-3, a container 2 for a liquid or other flowable material is mounted within the fuselage 4 of an aircraft 6. The container 2 is formed by a tank 8 and a gatebox 10. In the preferred embodiment, the tank 8 is constructed of fiberglass and the gatebox 10 is constructed of stainless steel; however, other materials having sufficient strength and corrosion resistance may be used.

Gatebox doors 12 and 14 are attached to sides 16 and 18, respectively, of the gatebox 10 by hinges 20. In this embodiment of the invention, five hinges 20 are spaced along the length of each of the doors 12 and 14. When closed, the doors 12 and 14 form the bottom of the gatebox 10. When open, the doors 12 and 14 expose a gatebox opening 56 in the bottom of the gatebox 10 through which the material (not shown) may flow.

Edges 22 and 24 of the doors 12 and 14 have seals (not shown). A strip 58 is attached to ends 36 and 38 of gatebox 10 midway between the sides 16 and 18, dividing the gatebox opening 56 in half. When the doors 12 and 14 are closed, the seals (not shown) engage the perimeter of the gatebox opening 56 and the strip 58, preventing leakage of the material (not shown) from the gatebox 10.

Door drive shafts 26 and 28 are supported by bearings 30. The bearings 30 are attached to reinforcing plates 32 and 34, which are attached to the ends 36 and 38 of the gatebox 10. A gear 40 is attached to the shaft 26 and may be rotated by a hydraulic rotary actuator 42. The gear 40 is meshed with a gear 44, which is attached to the shaft 28. When the actuator 42 rotates, the shaft 26 is rotated in the direction of actuator rotation and the shaft 28 is rotated in the opposite direction.

Hydraulic power is provided for the actuator 42 by an accumulator (not shown) that is pressurized by a dc-powered hydraulic pump (not shown). The pump (not shown) is powered by the aircraft's dc power bus (not shown).

A plurality of two-plate shaft bosses 46 are attached to the shafts 26 and 28 and disposed along the lengths thereof. An equal number of door bosses 52 are attached to the doors 12 and 14 and are substantially laterally opposed to the shaft bosses 46. Door rods 50 are rotably attached to the shaft bosses 46 by fasteners 48 and to the door bosses 52 by fasteners 54, each door rod 50 thereby mechanically linking a shaft boss 46 and its laterally-opposed door boss 52. When the shafts 26 and 28 are rotated, the rods 50 push or pull the doors 12 and 14, thereby opening or closing them.

All the parts within the gatebox are exposed to fluid and, thus, are constructed of corrosion-resistant material, such as stainless steel or suitably coated steel or aluminum.

An electronic control system 64 (See FIG. 4) controls the hydraulic rotary actuator 42. The control system 64 will be described below In operation, the control system 64 signals the actuator 42 to position the doors 12 and 14 at a specific angle relative to the bottom opening 56 of the gatebox 10, thus controlling the rate of flow of material leaving the container 2.

A potentiometer 60 is mechanically connected to the actuator 42 and electrically connected to the control system 64. When the actuator 42 rotates, the potentiometer 60 provides an electrical signal to the control system 64, which signal varies with the angular position of the actuator 42, thus providing an actuator position feedback signal for the control system 64.

A level sensor 62 is electrically connected to the control system 64, providing an analog electrical signal that varies with the volume of material in the container 2. An accelerometer 66 (See FIG. 4) is also electrically connected to the control system 64, providing an analog electrical signal that varies with the vertical acceleration of the aircraft 4.

The Control System

Figure 4:
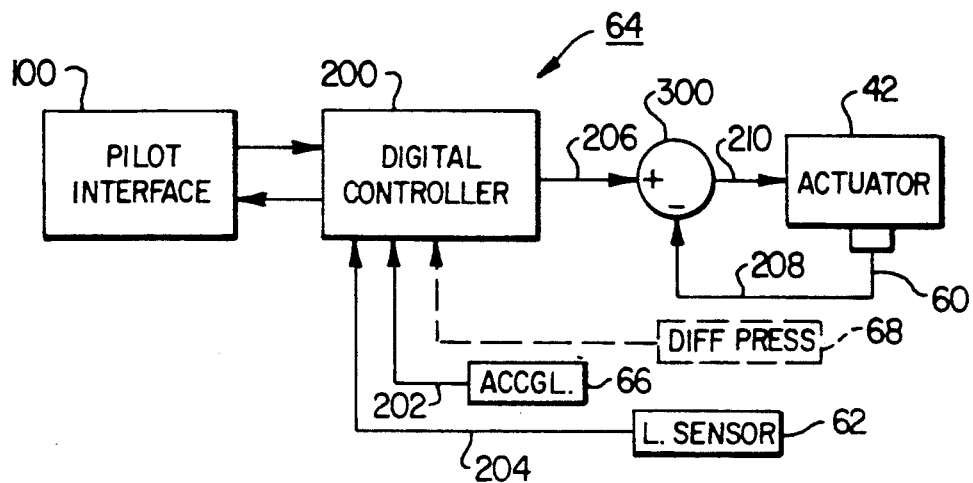
FIG. 4 is a block diagram of the control system.

As seen in FIG. 4, the control system 64 comprises the actuator 42, the potentiometer 60, the level sensor 62, the accelerometer 66, a pilot interface panel 100, a digital controller 200, and a servo card 300.

The digital controller 200 includes a central processing unit ("CPU"), random access memory ("RAM"), two analog-to-digital converters ("A/Ds"), and a digital-to-analog converter ("D/A") (all not shown). The A/Ds digitally encode analog inputs 202 and 204 from the accelerometer 66 and the level sensor 62, respectively. Operating in accordance with a program stored in the RAM, the CPU computes a digital actuator control signal (not shown). The D/A converter converts the digital control signal (not shown) into an analog control signal 206 and directs that signal to the servo card 300. The potentiometer 60 also provides a signal 208 to the servo card 300. The servo card 300 subtracts the potentiometer signal 208 from the analog control signal 206 and directs a difference signal 210 to the hydraulic rotary actuator 42, which difference signal 210 controls the position of the rotary actuator 42.

Figure 5:
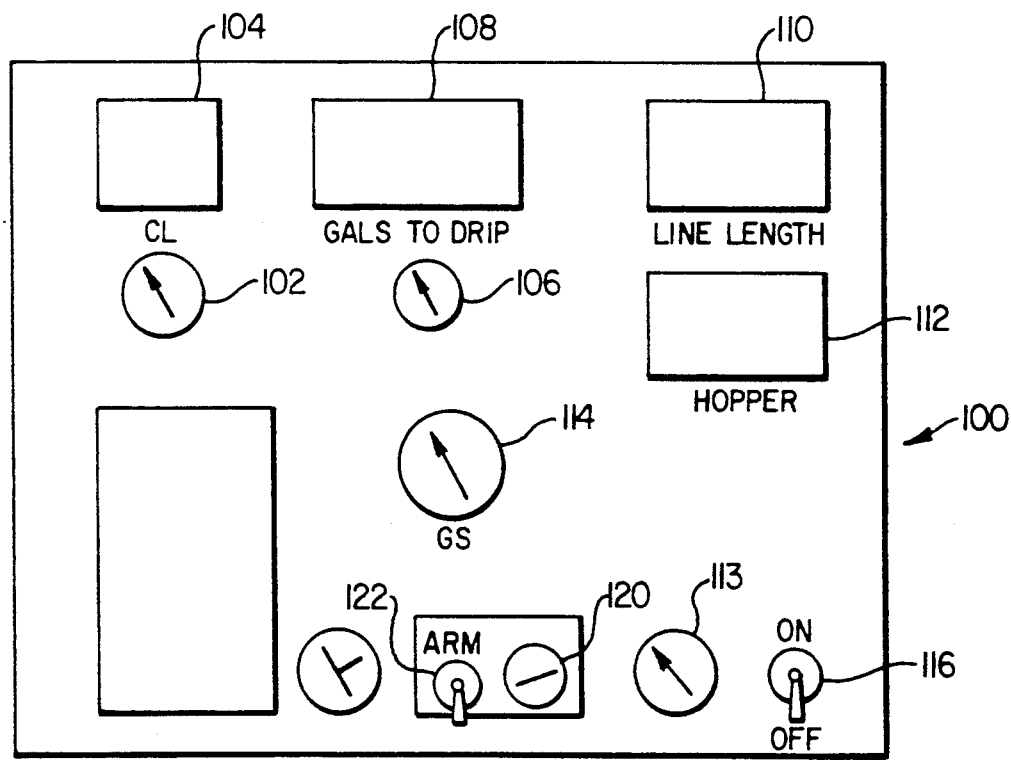
FIG. 5 is a top view of the pilot interface panel.
Figure 6:
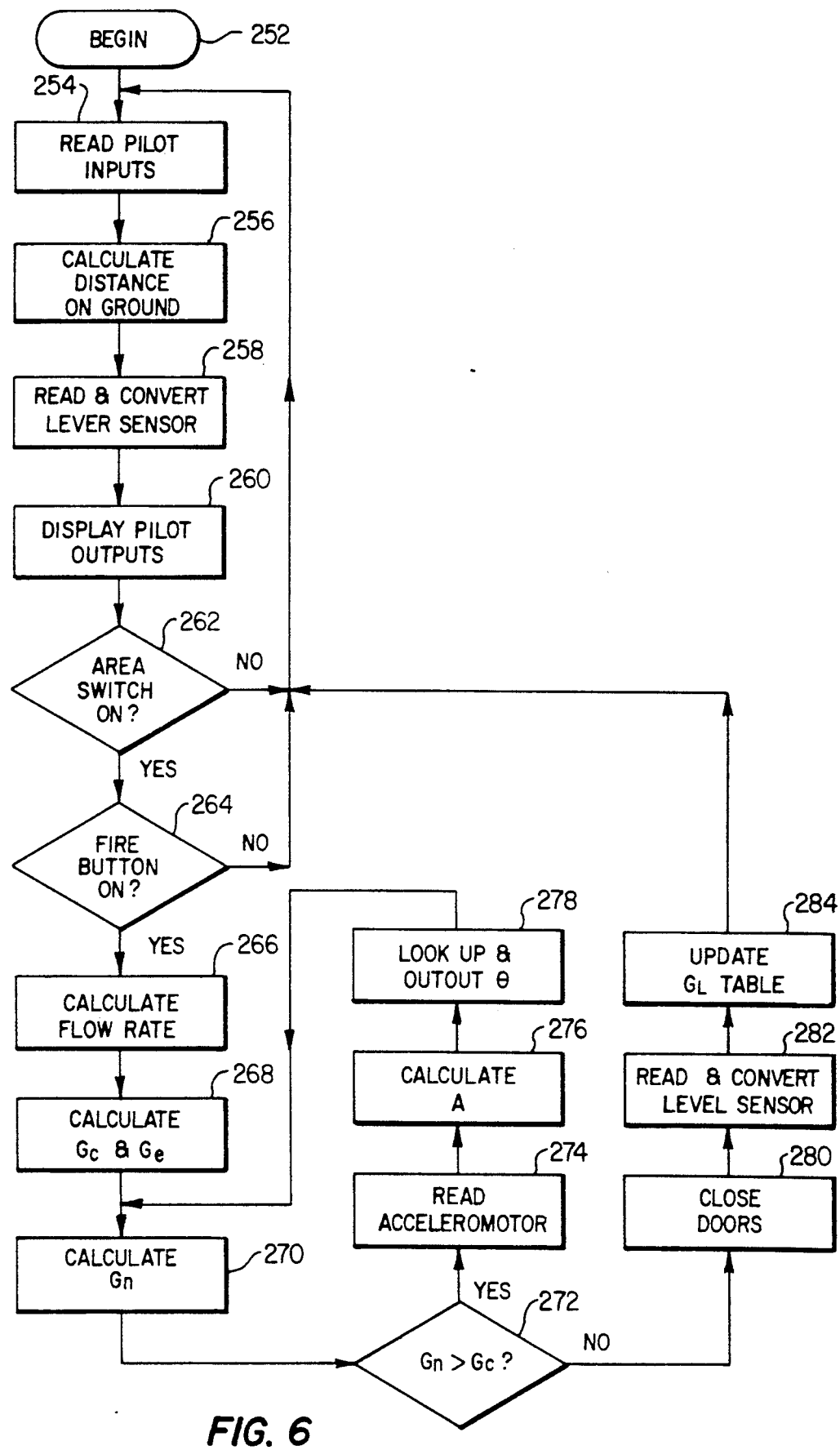
FIG. 6 is a flow diagram of the digital controller program.

FIG. 5 shows the pilot interface panel 100 and FIG. 6 is a flow diagram of the controller program. The pilot interface panel is located in the aircraft's cockpit (not shown) and is readily accessible to the pilot (not shown).

Placing switch 116 on the pilot interface panel in the ON position provides electrical power to the control system 64 and the hydraulic pump (not shown) and begins the controller program at block 252.

At any time prior to beginning a drop, the pilot may use controls on the pilot interface panel to enter the coverage level desired, the desired volume of material to be dropped, and the anticipated speed of the aircraft over the ground during the drop. The desired coverage level, from 0.5 to 4.0 gallons/100 square feet in 0.5 gallons/100 square feet increments, is entered using control 102, and displayed on display 104. Placing the coverage level control 102 in the SALVO position will cause the control system 64 to drop material at the maximum possible flow rate. The desired volume of material to be dropped, from 200 to 800 gallons in 50 gallon increments, is entered using control 106 and displayed on display 108. The brightness of all pilot interface panel displays is controlled by control 118. The anticipated speed of the aircraft over the ground during the drop is entered using control 114. Controls 102, 106, and 114 are binary-coded-decimal controls whose outputs may be read directly by the digital controller 200.

At block 254, the foregoing inputs are read and stored in the controller's RAM.

At block 256, the length of the drop pattern is calculated and stored in the RAM. The formula used for this calculation is $$D = \frac{100\ G}{W\ CL} = \frac{1.5385\ G}{CL},$$

where
D = length of the drop pattern (feet),
G = desired volume of material to be dropped (gallons),
CL = coverage level (gallons/100 square feet), and
W = width of drop pattern (feet).

The width of the drop pattern is assumed to be 65 feet, the value for a drop from an aircraft height of 100 to 125 feet above the ground. An aircraft height above the ground of 100 to 125 is preferable for fighting fires, the use to which this embodiment is put. If desired, or necessary for other uses of the invention, the drop pattern width may be easily changed by modifying the controller program.

At block 258, the level sensor signal 204 is read. Using an experimentally-determined conversion table stored in the RAM, the level sensor signal 208 is converted to the volume of material in the container, in gallons, and that value is stored in the RAM.

At block 260, the RAM values for length of drop pattern and number of gallons of material in the container are displayed on the pilot interface panel on displays 110 and 112, respectively.

At block 262, the position of an arm switch 122 is read. If the arm switch 122 is in the down (OFF) position, the program loops back to block 254. If the arm switch 122 is in the up (ON) position, armed light 120 is illuminated and the program continues on to block 264.

At block 264, the position of a fire button (not shown) is read. To allow the pilot easy access to the fire button, it is preferably located on the pilot's control wheel (not shown). If the fire button is not depressed (OFF), the program loops back to Block 254. If the fire button is depressed (ON), the program continues on to block 266.

At block 266, a desired material flow rate is calculated using the following formula:

$$Q = \frac{CL\ W\ V}{100} = 0.65\ CL\ V,$$

where
Q = desired material flow rate (gallons/second),
CL = coverage level (gallons/100 square feet),
W = width of drop pattern, again assumed to be 65 feet, and
V = aircraft speed over the ground (feet/second).

At block 268, a desired volume of material remaining in the container 2 at the end of the drop is calculated and stored in the RAM. The following formula is used:

$$Ge = Gi - Gd,$$

where
Ge = desired volume of material remaining in the container at the end of the drop (gallons),
Gi = volume of material in the container at the beginning of the drop (gallons), and
Gd = volume of material to be dropped (gallons).

In addition, it is necessary to begin closing the gatebox doors 12 and 14 before the desired ending material volume is reached, because the material continues to flow until the doors 12 and 14 are completely closed. The following formula is used:

$$Gc = Ge + Gl,$$

where
Ge = desired volume of material remaining in the container at the end of the drop (gallons),
Gc = volume of material in the container at which to begin closing the doors, and
Gl = lead volume (gallons).

Lead volume, Gl, is obtained from a table stored in the RAM. That table is determined experimentally and relates the lead volume required to the desired coverage level, CL, and the desired number of gallons remaining at the end the drop, Ge.

At block 270, the volume of material remaining in the container 2 is calculated using the following formula:

$$G_n = G(n-1) - QT,$$

where

Gn = volume of material remaining in the container (gallons),
G(n−1) = volume of material remaining in the container calculated in the previous iteration (gallons),
Q = desired material flow rate (gallons/second), and
T = incremental time since the previous iteration (seconds).

The first time that block 270 is performed by the controller (the first iteration), G(n−1) is set equal to the value determined at block 258. Thereafter, G(n−1) is set equal to the value of Gn calculated in the previous iteration of block 270. In addition, T is set to zero for the first iteration of block 270. Thereafter, T is set equal to the time that has elapsed since the previous iteration of block 270.

At block 272, Gn, the volume of material remaining in the container 2 calculated at block 270, is compared with Gc, the volume of material remaining in the container 2 at which to begin closing the gatebox doors 12 and 14 calculated at block 268. If Gn is less than Gc, the program continues on to block 274. If Gn is greater than or equal to Gc, the program jumps to block 280.

At block 274, the accelerometer signal 202 is read and stored in the RAM.

The flow of the material through the gatebox door opening is related to the differential pressure across the door opening by the following formula:

$$Q = A \sqrt{\frac{2 P_d}{\rho}},$$

where

Q = material flow rate,
A = effective flow area of the gatebox door opening,
Pd = differential pressure across the gatebox door opening, and
ρ = density of the material.

The differential pressure across the gatebox door opening varies according to the following formula:

$$P_d = \rho H g N + P_a - P_b,$$

where

H = height of the material above he bottom of the gatebox,
g = acceleration of gravity,
N = aircraft vertical acceleration (Gs, 1G being the vertical acceleration of an aircraft in straight and level flight),
Pa = air pressure in the container above the material, and
Pb = air pressure below the gatebox doors.

The difference between Pa and Pb (Pa−Pb) is due to aerodynamic effects. Pa−Pb may be neglected at the airspeeds at which this embodiment of the invention is operated without causing significant error in coverage level. Combining the above equations, neglecting Pa−Pb, and solving for A, $$A = \frac{Q}{2\sqrt{2HgN}}.$$

An experimentally-determined table relating A, the effective flow area of the gatebox door opening, and θ, the angular position of the rotary actuator 42, is stored in the RAM. Thus, if the variables on the right side of the above formula are known, the formula may be solved for A, and then the angle to which rotary actuator 42 must be positioned to obtain the desired material flow rate may be determined using the A-θ table.

At block 276, the effective flow area of the gatebox door opening required for the desired material flow rate is calculated using the following formula:

$$A = \frac{8.3096\, Q}{\sqrt{H_n N}},$$

where

A = effective flow area of gatebox door opening (square inches),
Q = desired material flow rate (gallons/second),
Hn = theoretical height of the material in the container (inches), and
N = vertical acceleration of the aircraft (Gs).

A table relating the volume of material remaining in the container 2 to the height of the material above the bottom of the gatebox 10 is stored in the RAM. Using that table, Gn, the volume of material remaining in the container 2 calculated at block 270, is converted to Hn, the theoretical height of the material in the container.

At block 278, the angle of the rotary actuator corresponding to the value of A calculated at block 276 is looked up in the A-θ table and an output representing that angle is directed to the servo card 300, which causes the actuator 42 to position the doors 12 and 14, thus achieving the desired material flow rate.

The program then loops back to block 270.

Blocks 270 through 278 are repeated approximately 30 times per second, varying the angle of the rotary actuator to maintain a constant desired material flow rate, until Gn is less than or equal to Gc, at which time the program jumps to block 280.

At block 280, the controller causes the rotary actuator 42 to close the gatebox doors 12.

At block 282, the level sensor signal 204 is read and converted to Ga, the actual volume of material remaining in the container 2.

At block 284, the table value of Gl, the lead volume, which was used at block 268 is updated using the formula:

$$G_{lc} = G_l + G_e - G_a,$$

where

Glc = corrected Gl (gallons),
Gl = Gl used at block 268 (gallons),
Ga = actual volume of material remaining in the container determined at block 282 (gallons), and
Ge = desired volume of material remaining in the container calculated at block 268.

In this manner, the program automatically compensates for variations in performance of the system.

After block 284, the program loops back to block 254, allowing another drop to be commenced.

In operation, the pilot first turns the control system 64 on using switch 116 on pilot interface panel 100. Using controls 102, 106, and 114, the pilot then enters the desired coverage level, the desired volume of material to drop, and the anticipated speed of the aircraft over the ground during the drop, respectively. The digital controller inputs the data. The controller then calculates the length of the drop pattern and outputs that length to display 110 on pilot interface panel 100.

Immediately prior to commencing a drop, the pilot arms the control system 64 using arm switch 122. To initiate the drop, the pilot presses the fire button (not shown) on the pilot's control wheel (not shown). The digital controller 200 then calculates the desired material flow rate required to achieve the desired coverage level. The digital controller 200 then repeatedly calculates the door angle required to maintain the desired material flow rate and, acting in conjunction with the servo card 300 and the potentiometer 60, causes the hydraulic actuator 42 to position the gatebox doors 12 and 14 to maintain the desired material flow rate. Simultaneously, the digital controller repeatedly calculates the volume of material remaining in the container 2, and closes the doors 12 and 14 when the desired volume of material has been dropped. Thus, the desired volume of material is automatically spread at the desired coverage level, allowing the pilot concentrate on flying the aircraft.

In another embodiment of the invention, a differential pressure sensor 68 senses the difference between the pressure of the material at the bottom of the gatebox 10 and the air pressure immediately adjacent to the gatebox doors 12 and 14. As the material pressure sensed includes the effect of the vertical acceleration of the aircraft, the accelerometer 66 is not needed and block 274 of FIG. 6 is eliminated In this embodiment, at block 276 the differential pressure sensor 68 is read at block 276 and the effective flow area of the gatebox opening is calculated using the following formula:

$$A = \frac{Q}{\sqrt{\frac{2 Pd}{\rho}}} = \frac{1.57948\, Q}{\sqrt{Pd}},$$

where
Q = desired material flow rate (gallons/second),
A = effective flow area of the gatebox door opening (square inches),
Pd = pressure differential sensor reading (pounds/square inch), and
$\rho$ = density of the material (pounds/gallon).

For the foregoing formula, the density the material was assumed to be that of water, 8.346 pounds/gallon. When using a material other than water, the constant in the foregoing formula may be changed to reflect that material's density.

With the exception of blocks 274 and 276 of the controller program, the remainder of the control system 64 functions as described for the preferred embodiment.

We claim:

1. A system for spreading a liquid or other flowable material on the ground from an aircraft at a specified coverage level, said system comprising:
   a container carried by the aircraft and adapted to contain said material;
   means for releasing said material from the container; and
   means for controlling the release means, the control means being responsive to an approximation of the difference in pressure between the material within the container adjacent to the release means and air outside the container adjacent to the release means.

2. The system of claim 1 wherein said release means comprises:
   at least one door that forms the bottom of said container and which is movably attached thereto; and
   means for moving each door.

3. The system of claim 2 wherein said release means comprises at least two doors and wherein each door is attached to the container by at lease one hinge.

4. The system of claim 3 wherein each hinge is parallel to a longitudinal axis of the aircraft.

5. The system of claim 4 wherein said door moving means moves said doors about said hinges and comprises:
   two shafts rotably attached to said container and parallel to the aircraft's longitudinal axis;
   each said shaft having at least one laterally extending shaft boss attached thereto;
   each said door having an inner surface to which at least one door boss is attached, each said door boss being substantially opposite a corresponding shaft boss;
   at least two rods having first and second ends;
   each said rod being pivotally attached to a shaft boss at said first end and pivotally attached to the corresponding door boss at said second end;
   each said shaft having a gear attached to an end thereof, said gears being meshed; and
   actuator means for rotating at least one of said gears.

6. The system of claim 5 wherein said actuator means comprises a hydraulic actuator.

7. The system of claim 2 wherein a door opening is created when said doors are opened and wherein said control means comprises:
   an actuator for moving said doors between open and closed positions;
   means for calculating a desired material flow rate through the door opening, which means is dependent upon the specified coverage level and the aircraft's speed over the ground as the material is released;
   means for calculating the volume of said material within the container;
   means for calculating the height of said material above the door opening, said height being dependent upon said calculated volume;
   means for measuring the vertical acceleration of the aircraft as the material is released;
   means for calculating said difference in pressure, which means is dependent upon said calculated height and said measured acceleration;
   means for calculating a position of said actuator to obtain said desired flow rate, which means is dependent upon said calculated difference in pressure; and
   means for controlling said actuator to obtain said actuator position.

8. The system of claim 7 wherein said control means comprises:
   a pilot interface panel electrically connected to a digital controller to allow the controller to accept data from the pilot interface panel and to allow the pilot interface panel to accept data from the digital controller;
   the digital controller being electrically connected to a servo card to allow the servo card to accept an output signal from the digital controller;
   the servo card being electrically connected to said actuator to allow an output signal from the servo card to control said actuator;

a manually-operated fire control for initiating a release of the material from the container, said fire control being electrically connected to the digital controller to allow the digital controller to accept an output signal from the fire control;

an accelerometer to measure the vertical acceleration of the aircraft, the accelerometer being electrically connected to the digital controller to allow the digital controller to accept an output signal from the accelerometer; and a program to control the digital controller.

9. The system of claim 8 further comprising:

feedback means responsive to the position of said actuator;

said feedback means being electrically connected to the servo card to allow the servo card to accept a feedback signal from the feedback means;

said servo card being adapted to generate said output signal for controlling said actuator by subtracting said feedback signal from said digital controller output signal.

10. The system of claim 8 wherein said pilot interface panel comprises:

controls for entering the specified coverage level, a desired volume of material to be dropped, and the aircraft's speed over the ground.

11. The system of claim 10 wherein said pilot interface panel further comprises:

at least one display for displaying the specified coverage level, the desired volume of material to be dropped, and the volume of material remaining in the container.

12. The system of claim 8 further comprising means for controlling electrical power to said control means.

13. The system of claim 8 further comprising means for arming said control means, which arming means must be armed to enable the control means to commence a release of the material.

14. The system of claim 13 further comprising indicator means which indicates when said arming means is armed.

15. The system of claim 8 further comprising means to discontinue a release of material from said container when the desired volume of material has been released.

16. A system for spreading a liquid or other flowable material on the ground from an aircraft at a specified coverage level, said system comprising:

a container carried by the aircraft and adapted to contain said material;

means for releasing said material from the container; and means for controlling the release means, the control means being responsive to the difference in pressure between the material within the container adjacent to the release means and air outside the container adjacent to the release means.

17. The system of claim 16 wherein said release means comprises:

at least one door that forms the bottom of said container and which is movably attached thereto; and means for moving each door.

18. The system of claim 17 wherein said release means comprises at least two doors and wherein each door is attached to the container by at least one hinge.

19. The system of claim 18 wherein each hinge is parallel to a longitudinal axis of the aircraft.

20. The system of claim 19 wherein said door moving means moves said doors about said hinges and comprises:

two shafts rotatably attached to said container and parallel to the aircraft's longitudinal axis;

each said shaft having at least one laterally extending shaft boss attached thereto;

each said door having an inner surface to which at least one door boss is attached, each said door boss being substantially opposite a corresponding shaft boss;

at least two rods having first and second ends;

each said rod being pivotally attached to a shaft boss at said first end and pivotally attached to the corresponding door boss at said second end;

each said shaft having a gear attached to an end thereof, said gears being meshed; and actuator means for rotating at least one of said gears.

21. The system of claim 20 wherein said actuator means comprises a hydraulic actuator.

22. The system of claim 17 wherein a door opening is created when said doors are opened and wherein said control means comprises:

an actuator for moving said doors between open and closed positions;

means for calculating a desired material flow rate through the door opening, which means is dependent upon the specified coverage level and the aircraft's speed over the ground as the material is released;

means for calculating the volume of said material within the container;

means for sensing the difference in pressure between the material in the container adjacent to the door opening and the air pressure outside the container adjacent to the door opening;

means for calculating a position of said actuator to obtain said desired flow rate, which means is dependent upon said difference in pressure; and means for controlling said actuator to obtain said actuator position.

23. The system of claim 22 wherein said control means comprises:

a pilot interface panel electrically connected to a digital controller to allow the controller to accept data from the pilot interface panel and to allow the pilot interface panel to accept data from the digital controller;

the digital controller being electrically connected to a servo card to allow the servo card to accept an output signal from the digital controller;

the servo card being electrically connected to said actuator to allow an output signal from the servo card to control said actuator;

a manually-operated fire control for initiating a release of the material from the container, said fire control being electrically connected to the digital controller to allow the digital controller to accept an output signal from the fire control; and a program to control the digital controller.

24. The system of claim 23 further comprising:

feedback means responsive to the position of said actuator;

said feedback means being electrically connected to the servo card to allow the servo card to accept a feedback signal from the feedback means;

said servo card being adapted to generate said output signal for controlling said actuator by subtracting said feedback signal from said digital controller output signal.

25. The system of claim 23 wherein said pilot interface panel comprises:
controls for entering the specified coverage level, a desired volume of material to be dropped, and the aircraft's speed over the ground.

26. The system of claim 23 wherein said pilot interface panel further comprises:
at least one display for displaying the specified coverage level, the desired volume of material to be dropped, and the volume of material remaining in the container.

27. The system of claim 23 further comprising means for controlling electrical power to said control means.

28. The system of claim 23 further comprising means for arming said control means, which arming means must be armed to enable the control means to commence a release of the material.

29. The system of claim 28 further comprising indicator means which indicates when said arming means is armed.

30. The system of claim 23 further comprising means to discontinue a release of material from said container when the desired volume of material has been released.

31. In a system for spreading a liquid or other flowable material on the ground from an aircraft, said system comprising a container carried by the aircraft and adapted to contain said material, means for releasing said material from the container, and means for controlling the release means, the control means being dependent upon a difference in pressure between the material within the container adjacent to the release means and air outside the container adjacent to the release means, a method for controlling the release of a specified volume of said material at a specified coverage level on the ground, said method comprising the steps of:
a. calculating a material flow rate through the release means required to achieve the specified coverage level;
b. calculating a volume of said material remaining in the container at which to terminate a release of the material in order to release the specified volume of the material;
c. adjusting the release means to maintain the required material flow rate therethrough;
d. calculating the volume of the material within the container;
e. repeating steps c and d until the value calculated in step c is equal to or less than the value calculated in step b; and
f. adjusting the release means to terminate the release of the material.

32. The method of claim 31 wherein said system further comprises means for inputting data into said control means, said data comprising the specified coverage level, an aircraft speed over the ground at the time of release, and a width of the material pattern on the ground, said step for calculating the material flow rate required to achieve the specified coverage level comprising the steps of:
a. inputting into the control means the specified coverage level, the aircraft speed over the ground at the time of release, and the width of the material pattern on the ground; and
b. calculating the flow rate required using the following formula:

$$Q = \frac{CL\ W\ V}{100},$$

where
Q = required material flow rate (gallons/second),
CL = desired coverage level (gallons/100 square feet),
W = width of material pattern on the ground (feet), and
V = aircraft speed over the ground at the time of release (feet/second).

33. The method of claim 32 wherein said system further comprises means for inputting into said control means a signal representing the level of the material in the container and a signal representing a desired volume of material to be released, an experimentally-determined table that relates the material level signal to the volume of the material in the container, and an experimentally-determined table that relates a lead volume, which is the volume of the material that is released as the release means terminates a release, to the material flow rate and an end volume, which is the volume of the material required to remain in the container at the termination of the release, said step for calculating the volume of the material remaining in the container at which to terminate a release of the material in order to release the specified volume of the material comprising the steps of:
a. inputting into the control means the material level signal and the desired volume to be released signal;
b. using the material level signal-volume remaining table, calculating an initial volume, which is the volume of the material in the container before commencing a release of the material;
c. calculating the end volume using the following formula:

$$Ge = Gi - Gd,$$

where
where
Ge = end volume,
Gi = initial volume, and
Gd = desired volume to be released;
d. using the lead volume-flow rate-end volume table, calculating the lead volume; and
e. calculating the volume of the material remaining in the container at which to terminate a release of the material in order to release the specified volume of the material using the following formula:

$$Gc = Ge - Gl,$$

where
Gc = volume at which to terminate release,
Ge = end volume value from step c, and
Gl = lead volume value from step d.

34. The method of claim 33 wherein said system further comprises means for determining an incremental time since performing a step of said method, said step of calculating the volume of the material within the container comprising the steps of:
a. determining the incremental time since step b was last performed; and
b. calculating the volume of the material within the container using the following formula:

$$Gn = G(n-1) - QT,$$

where
Gn = volume of the material within the container,
G(n−1) = volume of the material calculated when this step was last performed,
Q = desired material flow rate, and
T = incremental time value from step a.

35. The method of claim 34 further comprising the steps of:
  a. after adjusting said release means to terminate the release of said material, inputting the material level signal;
  b. calculating the volume of said material remaining in said container using the level signal-volume remaining table;
  c. calculating a corrected lead volume using the following formula:

$$Glc = Gl + Ge - Ga,$$

where
Glc = corrected lead volume,
Gl = lead volume currently stored in the lead volume-flow rate-end volume table,
Ge = end volume previously calculated in the step for calculating the volume of the material remaining in the container at which to terminate a release of the material in order to release the specified volume of the material, and
Ga = volume of the material remaining in the container calculated in step b; and
  d. replacing the lead volume stored in the lead volume-flow rate-end volume table with the corrected lead volume calculated in step c.

36. The method of claim 35 wherein the system further comprises means for inputting into the control means a signal that represents the vertical acceleration of the aircraft, a table that relates the volume of the material within the container to a height of the material within the container, and a table that relates an effective flow area of the release means to an adjustable position of the release means, said step for adjusting the release means to maintain the required material flow rate comprising the steps of:
  a. using the material volume-material height table and the value calculated in the step for calculating the volume of the material within the container, calculating the height of the material in the container;
  b. inputting the vertical acceleration signal;
  c. calculating a release means effective flow area required to maintain the required material flow rate using the following formula:

$$A = \frac{Q}{\sqrt{2HgN}},$$

where
A = release means effective flow area,
Q = material flow rate calculated in the step for calculating a material flow rate required to achieve said coverage level,
H = height of the material in the container calculated in step a,
g = the acceleration of gravity, and
N = the vertical acceleration of the aircraft from step b;
  d. using the effective flow area-adjustable position of the release means table, calculating the adjustable position of the release means required achieve the release means effective flow area calculated in step c; and
  e. adjusting the release means position to the position calculated in step d.

37. The method of claim 35 wherein said system further comprises means for inputting into said control means a signal dependent upon the difference in pressure between the material within the container adjacent to the release means and air outside the container adjacent to the release means and a table that relates an effective flow area of the release means to an adjustable position of the release means, said step for adjusting the release means to maintain the desired material flow rate comprising the steps of:
  a. inputting into said control means said differential pressure;
  b. calculating a release means effective flow area required to maintain the desired material flow rate using the following formula:

$$A = \frac{Q}{\sqrt{\frac{2Pd}{\rho}}},$$

where
A = release means effective flow area,
Q = desired material flow rate calculated in the step for calculating a desired material flow rate required to achieve the desired coverage level,
Pd = the differential pressure from step a; and
ρ = the density of the material;
  c. using the effective flow area-adjustable position of the release means table, calculating the adjustable position of the release means required achieve the release means effective flow area calculated in step b; and
  d. adjusting the release means position to the position calculated in step c.

* * * * *